United States Patent [19]
Miyake

[11] Patent Number: 5,516,291
[45] Date of Patent: May 14, 1996

[54] LETTER-TRAINING PLATE

[76] Inventor: Masaharu Miyake, 2-42, 2-chome, Miyamadai-cho, Kawanishi-city, Hyogo-prefecture, Japan

[21] Appl. No.: 287,894

[22] Filed: Aug. 9, 1994

[51] Int. Cl.$^6$ .................................................... G09B 11/04
[52] U.S. Cl. ............................................ 434/164; 434/163
[58] Field of Search ................................. 434/164, 163, 434/162, 90, 88, 87, 85

[56]         References Cited

U.S. PATENT DOCUMENTS

| | | | |
|---|---|---|---|
| 2,454,632 | 11/1948 | Cohn | 434/164 |
| 2,456,632 | 12/1948 | Greenberg | 434/164 |
| 3,197,892 | 11/1965 | Hancy | 434/164 |
| 3,314,171 | 4/1967 | Bethune | 434/164 |
| 3,526,975 | 9/1970 | Reeves | 434/164 |
| 3,774,319 | 11/1973 | Sprowls | 434/164 |
| 3,778,910 | 12/1973 | Smalligan | 434/164 |
| 3,869,813 | 3/1975 | Hancy | 434/163 |
| 4,685,885 | 8/1987 | Maddocks | 434/164 |
| 4,846,688 | 11/1989 | Jones | 434/164 |
| 5,000,688 | 3/1991 | Clamp | 434/164 |

*Primary Examiner*—Jessica J. Harrison
*Assistant Examiner*—Michael O'Neill
*Attorney, Agent, or Firm*—Wenderoth, Lind & Ponack

[57]         ABSTRACT

A letter of a correct form is engraved in a plate member in the form of a groove having a specified depth. Either a side wall on the bottom side of the groove is arranged in the form of an inclined surface inclining towards the side facing the user at a specified angle, or both of the side walls on both a top side and the bottom side of the groove are arranged in the form of inclined surfaces inclining towards the side facing the user at a specified angle. The plate member may further have indicia indicating the correct order of writing the letter and/or the bottom surface of the groove may be provided with a resistant surface providing resistance to writing. Such arrangements enable a user to naturally and effectively master correct and beautiful letters and a correct holding angle of a writing tool.

8 Claims, 3 Drawing Sheets

| 林 | 木 | 入 | 町 | 村 | 千 | 正 | 女 | 耳 | 三 | 犬 | 九 | 下 | 一 |
|---|---|---|---|---|---|---|---|---|---|---|---|---|---|
| 六 | 本 | 年 | 天 | 大 | 川 | 生 | 小 | 七 | 山 | 見 | 休 | 火 | 右 |
| 名 | 白 | 田 | 男 | 先 | 青 | 上 | 車 | 子 | 五 | 玉 | 花 | 雨 | |
| 目 | 八 | 土 | 竹 | 早 | 夕 | 森 | 手 | 四 | 口 | 金 | 貝 | 円 | |
| 立 | 百 | 二 | 中 | 草 | 石 | 人 | 十 | 糸 | 校 | 空 | 学 | 王 | |
| 力 | 文 | 日 | 虫 | 足 | 赤 | 水 | 出 | 字 | 左 | 月 | 気 | 音 | |

| A | B | C | D | E | F | G | H | I | J |
|---|---|---|---|---|---|---|---|---|---|
| K | L | M | N | O | P | Q | R | S | T |
| U | V | W | X | Y | Z | | | | |

| 1 | 2 | 3 | 4 | 5 | 6 | 7 | 8 | 9 | 10 |
|---|---|---|---|---|---|---|---|---|----|

LETTER-TRAINING PLATE

BACKGROUND OF THE INVENTION

1. Field of the Invention

The present invention relates to a letter-training plate apparatus used for learning letters used in various countries in the world including lines, hiragana, katakana, Chinese characters, numerals, alphabets and the like, and for training styles of handwriting thereof.

2. Description of the Prior Art

For learning the above described letters used in various countries in the world including lines, hiragana, katakana, Chinese characters, numerals, alphabets and the like and for training styles of handwriting thereof (hereinafter referred to as merely letters or characters), it has been popular to repeatedly copy models, as in the case when learning calligraphy. Further, pupils of the lower classes are made to trace model letters printed on flat plates to master the form of a letter.

However, although such conventional means for mastering letters have been quite popular over a long period of time, they are disadvantageous in that the effects of such means greatly depend on the talent and sensitivity of each individual, so that the form of a letter differs from person to person, and it has been very difficult to master a truly correct and beautiful form of a letter. All the more it has been long desired, subconsciously and actually, to find a way of mastering a correct and beautiful form of a letter by many people of all ages and countries. However, thus far there has been no effective means which satisfies such desire.

SUMMARY OF THE INVENTION

A first object of the present invention is to provide a letter-training plate capable of satisfying the desire to master a correct and beautiful form of a character such as a letter. A second object of the present invention is to provide a letter-training plate capable of achieving the first object more easily and which is convenient, particularly for pupils of the lower classes. A third object of the present invention is to provide a letter-training plate which enables easy mastering of a correct and beautiful form of a letter and of styles of handwriting, including a correct order of writing thereof, from the beginning on when becoming familiar with letters. A fourth object of the present invention is provide a letter-training plate which gives the impression as if writing on real paper and which enables a user to achieve rapid progress in mastering letters in a more effective manner.

In order to achieve the first object, a letter or character of correct form is engraved in a plate member in the form of a groove at a specified depth, and at least a side wall on the bottom side of the groove, i.e. the bottom of the letter or character, is arranged in the form of an inclined surface inclining towards the side facing the user at a specified angle. With such arrangement, if the pointed end of a writing tool is inserted in the groove and the side of the pointed end of the writing tool facing the user is pressed against the inclined side wall on the bottom side of the groove and is moved along the groove in such position, the writing tool is naturally held at a specified inclined angle relative to the surface of the plate member. Thus, correct and beautiful letters and the correct holding angle of the writing tool can be naturally mastered by repeating this movement.

In order to achieve the second object, side walls on both the top side and the bottom side of the groove are arranged in the form of inclined surfaces inclining towards the side facing the user at an appointed angle. With such arrangement, the writing tool can be naturally and regularly held at a correct inclined angle by means of the walls at both the top side and the bottom side by merely inserting the writing tool in the groove.

In order to achieve the third object, the plate member is provided with indicia numerals and lines indicating the order of writing the letter defined by the groove. With such arrangement, the correct order of writing can be mastered by tracing the writing tool along the groove in accordance with the indicia of the order of writing the letter defined on the plate member.

In order to achieve the fourth object, the bottom surface of the groove is provided with a resistant surface providing resistance to writing. With such arrangement, a writing resistance similar to that when writing on real paper with a pencil can be simulatively experienced.

Other objects of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The present invention will be more fully understood from the detailed description given hereinbelow and the accompanying drawings which are given by way of illustration only of preferred embodiments of the present invention, and thus are not intended to be limiting thereto, and wherein.

DESCRIPTION OF THE PREFERRED EMBODIMENTS

The preferred embodiments of the present invention will be described below.

Figures 3, 4:
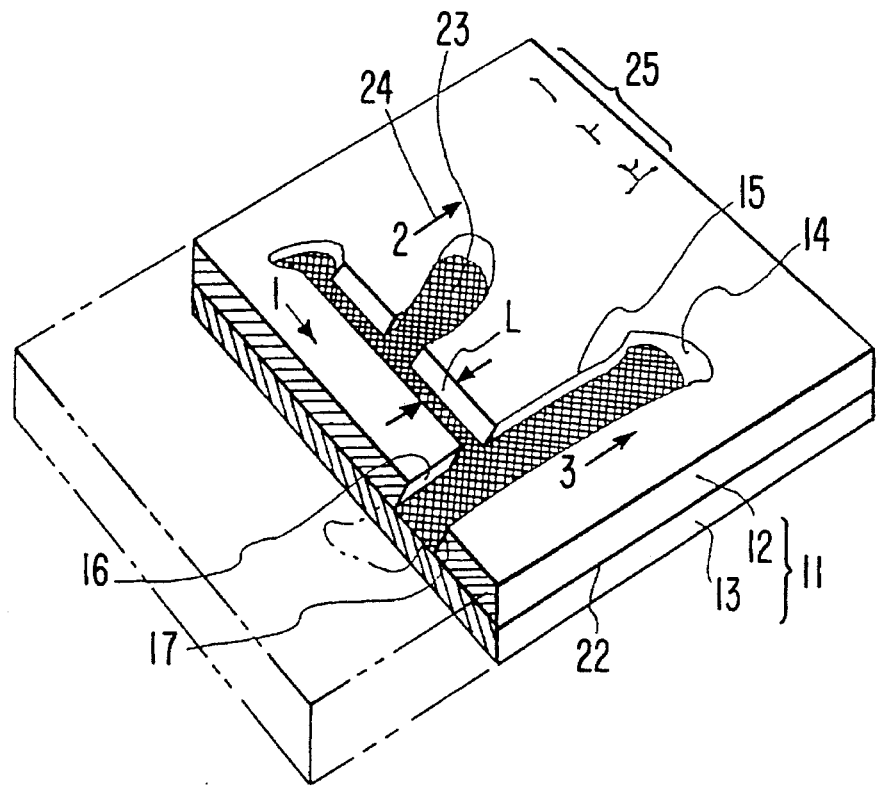
FIG. 3 is a partially removed perspective view showing a letter-training plate according to a preferred embodiment of the present invention.
FIG. 4 is a view showing a modification of the present invention.

Referring to FIG. 3, a plate member 11 serving as a letter-training plate includes upper and lower flat plates 12, 13 made of synthetic resin such as acrylic resin which are laid and pasted one on top of another and which are different in color. The upper flat plate 12 is provided with a letter or character 15 of correct shape (In the case of FIG. 3, the Chinese character 上) engraved therein in the form of a groove 14 uniform in width so as to pass through the upper plates. The thickness of the upper flat plate 12 is suitably selected within a range of about 1.5 to 3 mm.

Figure 2:
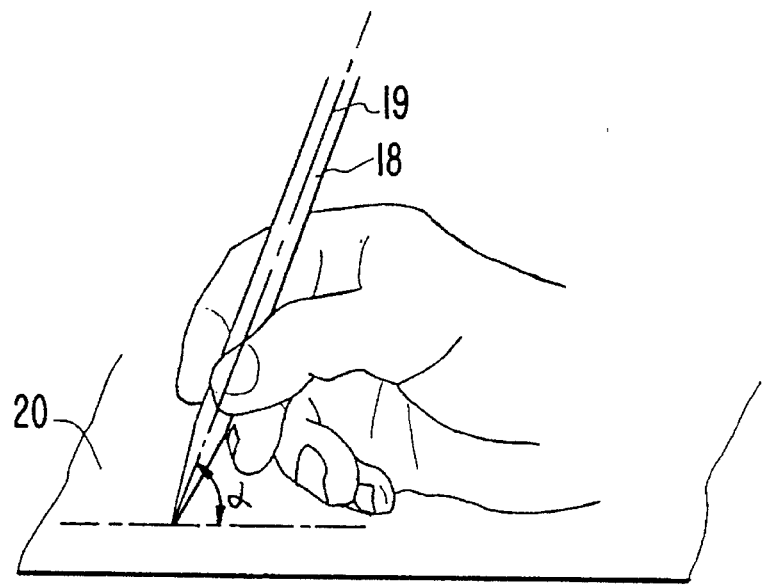
FIG. 2 is a diagram showing an ideal writing angle of a writing tool relative to a paper surface.

Side walls 16, 17 on the top and bottom sides of the groove 14, i.e. the top and bottom of the letter or character, are arranged in the form of inclined surfaces inclining towards the side facing the user, i.e. in a direction downwardly into the groove and away from the user or the bottom of the character, at a specified angle within a range of 35° to 60°, preferably 45°, to regulate the posture of a writing tool 18 (FIG. 2), such as a pencil, a ball point pen or a rod-like member with a sharp pointed end to naturally incline towards the side facing the user at an angle of 35° to 60° relative to the surface of the upper flat plate 12 when such tool is inserted in the groove 14. As shown in FIG. 2, the above mentioned angle of 35° to 60°, preferably 45°, is an ideal angle for the angle α between a longitudinal center axis 19 of the writing tool 18 and a paper surface 20. Further, the width L of the groove 14 is formed so as not to prevent the pointed end of the writing tool 18 from touching the surface of the lower flat plate 13 when the pointed end of the writing tool 18 is inserted in the groove 14. The suitable range for the width L of the groove 14 is within a range of about 1 to 3 mm.

More concretely, the plate member 11 is prepared by first cutting the letter 15 out from the upper flat plate 12 in the form of the groove 14, applying adhesive 22 to a lower surface of the thus obtained upper flat plate 12, and pasting the upper flat plate 12 to the upper surface of the lower flat plate 13.

By using different colors for the upper flat plate 12 and the lower flat plate 13, the color of the lower flat plate 13 can be seen through the groove 14 and the letter 15 can be clearly recognized so that it is convenient, particularly for pupils of the lower classes. It is, however, not always necessary that the colors of the upper flat plate 12 and the lower flat plate 13 be different, since the same effect can be achieved by using plates of the same color and/or which differ in brightness and/or transparency.

As shown in FIG. 3, it is preferable to file or provide fine unevennesses to the entire upper surface of the lower flat plate 13 or at least a portion thereof corresponding to the groove 14 of the upper flat plate 12, thereby to form a resistance surface 23 that provides resistance when moving the writing tool 18. Such feature provides a feeling to the user as if he or she were actually writing on real paper. In addition, in the case where such resistant surface 23 provided by filed teeth or fine unevennesses is provided, the adhesion of the upper flat plate 12 to the lower flat plate 13 can be increased.

Further, as shown in FIG. 3, it is further preferable that the orders of writing 24, 25 of the letter 15 are displayed on the flat plate 12 by a suitable method such as printing or engraving. For instance, although not shown, the Chinese way of pronunciation and the Japanese way of pronunciation when the letter 15 is a Chinese character, or the way of reading in case the letter 15 is a cursive character and the like may be indicated as well.

Although both of the side walls 16, 17 of the groove 14 on both the top side and the bottom side are arranged in the form of inclined surfaces, it would be sufficient if at least the side wall 17 on the bottom side is inclined at the above described angle.

Although the plate member 11 is formed by pasting the upper flat plate 12 to the lower flat plate 13 in the preferred embodiment shown in FIG. 3, one piece of flat plate having a thickness equivalent to the thickness of both the upper and lower plates 12, 13, may be used to form the letter 15 by engraving the groove 14 to have a specified depth.

Figures 5, 6:
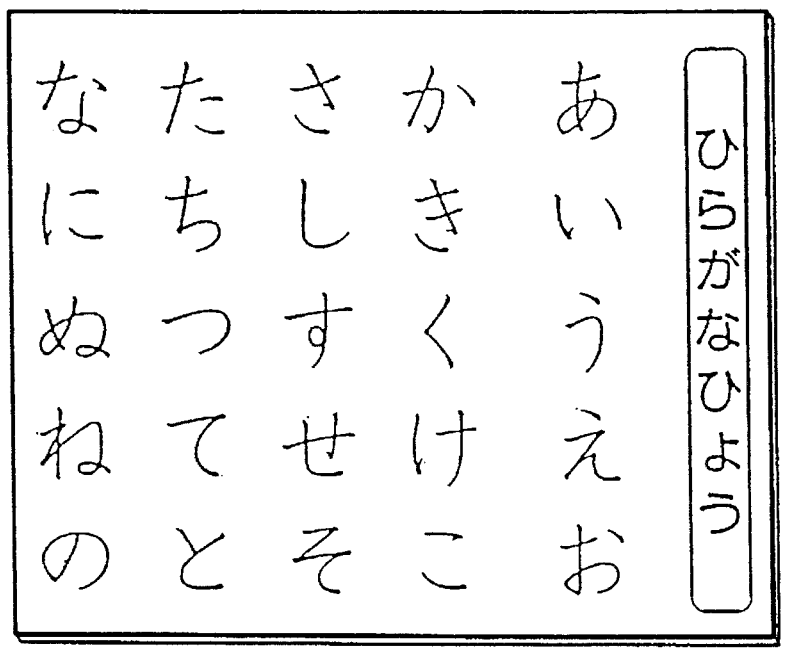
FIG. 5 is a view showing another modification of the present invention.
FIG. 6 is a view showing still another modification of the present invention.

In the above described respective preferred embodiments, although only one letter was engraved in one piece of a plate member for convenience, there may be engraved, for example, all (80) Chinese characters to be learned in the first grade of elementary school (see FIG. 4) or a desired number of hiragana (see FIG. 5) or alphabets (see FIG. 6) in a single plate member, as shown in FIGS. 4 to 6. Further, although a plurality of numerals are engraved in the same flat plate in FIG. 6, it goes without saying that the numerals may be engraved in separate flat plates.

Although the flat plate 11 is made of synthetic resin in the above described preferred embodiments, it goes without saying that the flat plate 11 may be formed of a wooden flat plate, a cardboard including one obtained by pasting a plurality of papers to each other, a corrugated cardboard and the like. Additionally, although the letter 15 is provided in the flat plate 11 by means of engraving or cutting out in the above described preferred embodiments, it goes without saying that the letters may be molded in the case of using synthetic resin.

In particular, in the case where the flat plate 11 is made of synthetic resin or the like, the upper flat plate 12 may be arranged to be detachable from the lower flat plate 13 to use one lower flat plate 13 in common for all letters, that is, as a lower flat plate which can be used in common for all of a plurality of upper flat plates 12 (the respective flat plates for use for various letters used in the world such as hiragana, katakana, Chinese characters, alphabets and the like as well as numerals). In this case, it is still more desirable that filed teeth or other unevennesses be provided all over the upper surface of the lower flat plate 13. Further, there may be provided means such as a fixing means or position-regulating means in order to prevent the upper flat plate from slipping from the lower flat plate when put thereon. The fixing means may be, for example, a fixing means wherein projections projecting from arbitrary locations of the lower surface of the upper flat plate 12 are detachably engaged with concave portions engraved in the upper surface of the lower flat plate 13. The position-regulating means may be, for example, ribs extending upwardly from the peripheral edges of the upper surface of the lower flat plate 13, with the longitudinal and lateral widths of the upper flat plate 12 being set so as to be equivalent to or slightly smaller than the inside measurements of such ribs, the upper flat plate 12 being engaged with the insides of the ribs on four sides of the lower flat plate 13. The fixation can be still more enhanced by means of the ribs of the lower flat plate 13 fitting into notches or concave portions formed at the peripheral edges of the upper flat plate 12 as occasion demands.

Figure 1:
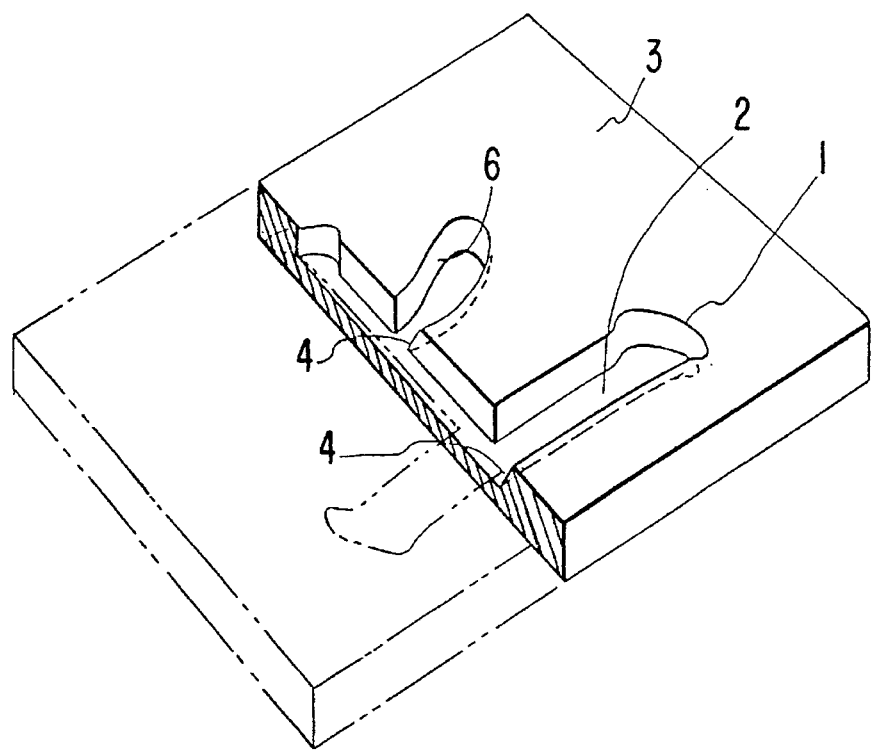
FIG. 1 is a diagram showing the principle structure of the present invention.

In FIG. 1, letter 1 corresponds to the letter 15 of FIG. 3, the groove 2 corresponds to the groove 14, the plate member 3 corresponds to the plate member 11, the side wall 4 on the bottom side corresponds to the side wall 17 on the bottom side, and the side wall 6 on the top side corresponds to the side wall 16 on the top side.

The present invention arranged in the manner described above results in the following effects.

Contrary to conventional methods, writing of letters may be trained by the use of the letter-training plate provided with grooves regulating both a correct style of the letter and a correct angle of the pen shaft, so that correct and beautiful letters and a correct holding angle of the writing tool can be naturally mastered without great effort.

For regularly holding and naturally keeping the writing tool at a correct inclined angle, the writing tool is merely inserted in the groove 2 having side walls 4, 6 on both the top side and the bottom side in the form of inclined surfaces inclining towards the side facing the user at a specified angle, thereby enabling the user to master correct and beautiful letters and a correct holding angle of the writing tool effectively without great effort.

In addition, since the correct orders of writing are simultaneously indicated with the letters, particularly pupils of the lower classes can naturally master, not only beautiful letters and a correct holding angle of the writing tool, but also the correct orders of writing of the letters.

Furthermore, a writing resistance similar to that when writing on real paper with a pencil can be simulatively experienced by providing the bottom of groove 2 with the resistant surface 23 providing writing resistance, so that mastering the letters can be achieved in a still more effective manner.

Since no paper is used, contrary to conventional methods, the present invention is advantageous in that it is resource saving.

The invention being thus described,, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An apparatus for use in training a user to correctly write characters such as letters or numerals, said apparatus comprising:

a plate member;

said plate member having formed therein a groove in the shape of a character;

said groove being defined by a bottom surface spaced from an upper surface of said plate member by the depth of said groove and by spaced side walls;

said spaced side walls including bottom side wall portions located at positions closer to a bottom of said character and top side wall portions located at positions closer to a top of said character; and both said top side wall portions and said bottom side wall portions being defined by respective surfaces that are inclined in a direction downwardly into said groove and away from said bottom of said character.

2. An apparatus as claimed in claim 1, further comprising indicia on said plate member indicating a correct order for writing said character.

3. An apparatus as claimed in claim 2, wherein said bottom surface of said groove is provided with means to impart resistance to movement thereover by a writing instrument.

4. An apparatus as claimed in claim 1, wherein said bottom surface of said groove is provided with means to impart resistance to movement thereover by a writing instrument.

5. An apparatus as claimed in claim 1, wherein said inclined surfaces extend at an angle of 35° to 60° to said bottom surface of said groove.

6. An apparatus as claimed in claim 5, wherein said angle is 45°.

7. An apparatus as claimed in claim 1, wherein said plate member comprises a bottom plate and a top plate fixed to said bottom plate.

8. An apparatus as claimed in claim 7, wherein said groove extends entirely through the thickness of said top plate, and said bottom surface of said groove comprises an upper surface of said bottom plate.

* * * * *